Figure 1:
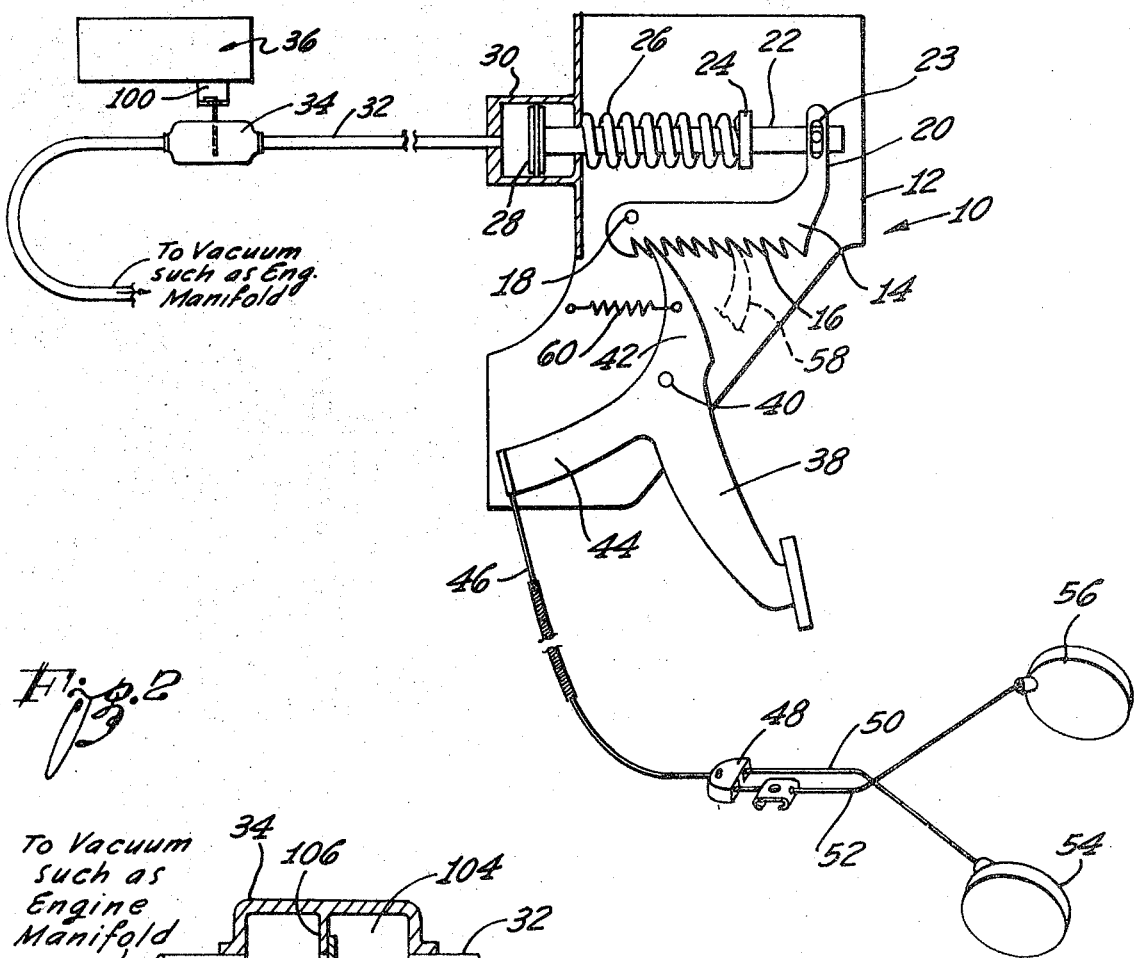

United States Patent

[11] 3,552,518

| [72] | Inventors | Sam Aidner<br>700 N. Arden Drive, Beverly Hills, Calif. 94710;<br>Anthony J. Russo, Los Angeles, Calif. |
|---|---|---|
| [21] | Appl. No. | 684,268 |
| [22] | Filed | Nov. 20, 1967 |
| [45] | Patented | Jan. 5, 1971 |
| [73] | Assignee | said Russo assignor to said Aidner |

[54] VEHICLE ANTI-THEFT DEVICE UTILIZING THE PARKING BRAKE
8 Claims, 2 Drawing Figs.

[52] U.S. Cl. .................................................. 180/114, 70/179, 70/237; 188/265
[51] Int. Cl. .................................................. B60r 25/00
[50] Field of Search ........................................ 180/82, 114; 70/237, 181, 315, 179, 242; 188/106(P), 265; 192/3; 74/531—539; 303/89

[56] References Cited
UNITED STATES PATENTS

| 1,726,530 | 9/1929 | Gillen | (180/114UX) |
| 1,966,621 | 7/1934 | Folberth et al. | 70/237X |
| 1,967,151 | 7/1934 | Lustick | 70/237X |
| 2,959,261 | 11/1960 | Hemphill | 74/539X |
| 2,968,378 | 1/1961 | Yanda | (180/82UX) |
| 3,040,556 | 6/1962 | Rosenhagen | 70/315 |
| 3,119,477 | 1/1964 | Ryder | 192/3 |
| 3,367,208 | 2/1968 | Fender | 74/531 |
| 3,370,671 | 2/1968 | Stortz | 180/82 |
| 2,881,789 | 4/1959 | Finazzo | 70/242X |

*Primary Examiner*—Kenneth H. Betts
*Attorney*—Smyth, Roston & Pavitt

ABSTRACT: This invention relates to an antitheft device for use with an automobile of the type including a vacuum release parking brake mechanism. In the present invention a valve is included in the vacuum line which controls the release of the parking brake and a lock is coupled to the valve so as to control the operation of the valve. Specifically, the valve is controlled so that the vacuum does not release the parking brake when the lock is in the locked position. In a particular embodiment of the invention, the lock is a combination lock so that the operator of the automobile does not have to carry any additional keys.

PATENTED JAN 5 1971

3,552,518

INVENTORS:
Sam Aidner
Anthony J. Russo

ATTORNEYS

VEHICLE ANTI-THEFT DEVICE UTILIZING THE PARKING BRAKE

Many automobiles currently manufactured include a parking brake which is vacuum released. Specifically the parking brake is actuated when the operator of the automobile stops the automobile and shuts off the engine. The operator of the automobile then engages the parking brake, usually by depressing a foot pedal. The vacuum release type of parking brake cannot be released until the automobile is started since the release of the parking brake is controlled by a vacuum system. Specifically, the intake manifold of the automobile is used to provide sufficient vacuum force to release the parking brake upon the starting of the automobile. Other sophistications in the vacuum release type of parking brake system include an optional mechanism which does not allow the vacuum force to release the parking brake immediately upon the starting of the automobile but only until the transmission of the automobile is shifted into a drive position.

The present invention uses this vacuum release parking brake system to provide for a very effective simple and reliable antitheft device which prevents the release of the parking brake even upon the starting of the automobile and the shifting of the automobile into the drive position. Specifically, the invention includes interrupting the vacuum line which is coupled to the vacuum release mechanism which in turn controls the release of the parking brake, and inserting in the vacuum line a valve mechanism.

The valve mechanism has an open and closed position and in the closed position the vacuum from the intake mechanism is not effective to release the parking brake. The position of the valve is controlled by a lock which may be mounted upon the dashboard of the automobile. Specifically, the lock has open and lock positions and in the lock position the valve is controlled to be in the closed position so as to prevent the release of the parking brake. In order that the operator of the automobile not have to carry any additional keys, the lock is preferably a combination lock. Specifically, a combination lock of the type shown in U.S. Pat. No. 3,040,556 issued to William Rosenhagen on June 26, 1962, may be used for the lock mechanism.

Figure 2:
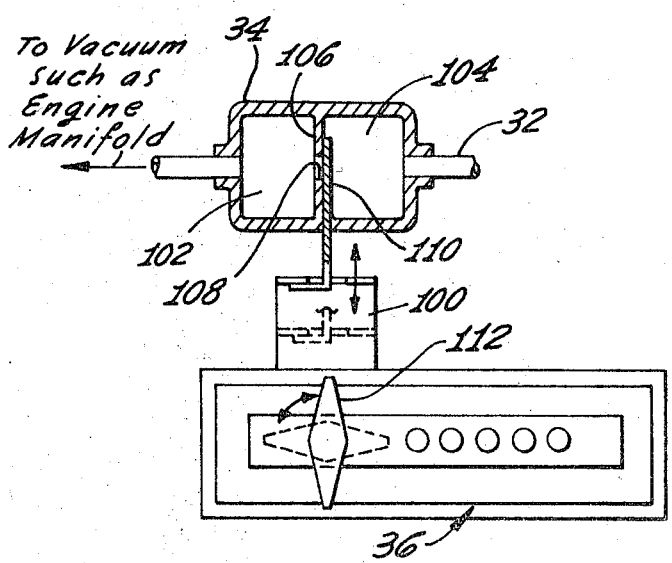

It can be seen, therefore, that the present invention is very simple in that it provides for an effective antitheft device which incorporates structure already present in the automobile. The use of structure already present in the automobile also lowers the cost of the antitheft device of the present invention. A clearer understanding of a particular embodiment of the invention may be had with reference to the following description and the drawings wherein:

FIG. 1 illustrates the overall mechanism of the antitheft device of the present device as incorporated in a vacuum release parking brake assembly, and FIG. 2 illustrates in more detail the valve assembly as controlled by the lock mechanism.

In FIG. 1, a parking brake assembly 10 includes an outer housing 12. Enclosed within the outer housing is a ratchet assembly 14 including ratchet teeth 16. The ratchet assembly 14 is pivoted around the pivot point 18. An upwardly extending arm 20 is part of the ratchet assembly 14 and the arm 20 is connected to a rod 22. For example, the rod 22 may be loosely pinned within a slot 23 in the arm 20 so that the ratchet assembly 14 and the rod 22 may move together. A collar 24 is fastened to the rod 22 and a spring 26 in compression is positioned between the collar 24 and the housing 12. It can be seen, therefore, that the spring 26 acting through one end of the rod 22 normally pushes the arm 20 in a clockwise direction.

The other end of the rod 22 is formed as a piston 28 and the piston 28 is positioned within a chamber 30. The chamber 30 is attached to a vacuum line 32. The passage of the vacuum through the vacuum line 32 is controlled by a valve 34. The valve 34 has open and closed positions. The positions of the valve 34 are mechanically controlled by a lock mechanism 36.

The parking brake assembly 10 also includes a foot pedal 38. The foot pedal 38 is pivoted around a pivot point 40. The foot pedal 38 includes two outwardly extending arms 42 and 44. The end of the arm 42 serves as a pawl to cooperate with the ratchet teeth 16. A cable 46 is attached to the end of the arm 44 and the cable 46 is used to mechanically activate the rear brakes of the automobile in the locked position when the foot pedal 38 is activated. In the specific operation of the mechanical parking brake system, the cable 46 is coupled through an equalizer 48 to a second pair of cables 50 and 52. The second pair of cable 50 and 52 are in turn connected to the rear brake assemblies 54 and 56.

As can be seen in FIG. 1, when the foot pedal 38 is pushed down so as to rotate the arm 42 clockwise, the tip of the arm 42 is locked in the clockwise position as shown by the dotted line portion 58. The arm 42 and the foot pedal 38 are normally urged in a counterclockwise position by the spring 60, but the engagement of the pawl with the ratchet teeth 16 locks the foot pedal 38 in the dotted position 58. At the same time the arm 42 is rotated in a clockwise position, the arm 44 is also rotated in a clockwise position. The rotation of the arm 44 pulls the cable 46 thereby pulling the cables 50 and 52 through the equalizer 48. The equalizer 48 is used for adjustment so that both cables 50 and 52 are pulled by equal amounts. The movement of the cables 50 and 52 mechanically operates the brake shoes within the brake assemblies 54 and 56.

Assuming the valve 34 to be in the open position the operation of the vacuum release is as follows. When the engine is started the vacuum from the engine intake manifold passes through the vacuum line 32 and pulls the piston 28 to the left. As the piston is pulled to the left the rod 22 is also pulled to the left which in turn rotates the arm 20 counterclockwise. The counterclockwise rotation of the arm 20 releases the pawl portion of the arm 42 and the spring 60 pulls the brake pedal 38 to its normal position. The arm 44 is also rotated counterclockwise to free the brake shoes within the brake assemblies 54 and 56. As can be seen from FIG. 1, if the valve 34 is in the closed position and thereby preventing the passage of the vacuum through the vacuum line 32, the parking brakes remain in the locked position.

The present invention uses the valve 34 in combination with the lock 36 such as a combination lock to prevent the release of the parking brake until the lock 36 is unlocked. A clearer understanding of the lock and valve combination may be seen with reference to FIG. 2. In FIG. 2, the lock 34 may be any type of a lock which includes a latch 100. For example, the lock 36 may be a combination lock of the type shown in Pat. No. 3,040,556. However, it is to be appreciated that other types of locks may be used such as normal key actuated locks.

The valve 34 includes two chambers 102 and 104. A wall member 106, which includes an opening 108, separates the chambers 102 and 104. A sliding member 110 is physically attached to the latch 100 and the member 110 passes across the opening 108. As shown by the full line position in FIG. 2 the member 110 prevents the vacuum from passing to the vacuum line 32. In the dotted position of the latch and member 110 as shown in FIG. 2, the member 110 is pulled clear of the opening 108 so as to allow the vacuum to pass to the vacuum line 32 and release the parking brake assembly.

In the normal operation of the antitheft device of the present invention, when the automobile is stopped the parking brake assembly is activated by stepping on the foot pedal 38. The lock 36 is then turned to the lock position, as shown by the full line position of a knob 112. If anyone tries to tamper with the automobile and even if they start the engine, the parking brake assembly will not release. However, when the owner returns, he starts the automobile and then punches out the proper combination to turn the knob 112 to the dotted position, thereby opening the valve and actuating the vacuum release for the parking brake assembly. It is to be appreciated that the particular sequence of operations is not important and the owner can reset the lock before operating the parking brake. If the parking brake assembly includes a manual release, it is desirable to either incapacitate this manual release or to remove the manual release.

It is to be appreciated that the antitheft device of the present invention is relatively foolproof since a thief in attempting to steal the automobile would have great difficulty in operating the lock 36. Also, if the thief cuts the vacuum lines in attempting to inactivate the antitheft device of the present invention, the cutting of the vacuum lines does not allow the parking brake assembly to be released since only by the proper operation of the valve 34 is the parking brake assembly released.

It is to be appreciated that the antitheft device of the present invention is very simple in operation and relatively inexpensive in cost, since it may be added to an existing vacuum release parking brake assembly already present on many existing automobiles and may be added to the newer automobiles since the vacuum release parking brake assembly is part of the equipment on many newer automobiles.

It is to be appreciated that although the invention has been described and illustrated with reference to a particular embodiment, other adaptations and modifications may be made and that the invention is only to be limited by the appended claims.

We claim:

1. An antitheft device for use with an automobile having a vacuum line connected to a vacuum release parking brake assembly and with the automobile having an ignition lock, including:
   a lock mechanism separate from the ignition lock having open and locked positions;
   a valve assembly coupled to the lock mechanism and with the valve assembly having open and closed positions and with the position of the valve assembly controlled by the position of the lock mechanism; and
   means interconnecting the valve assembly with the vacuum line to prevent the release of the parking brake when the lock mechanism is in the locked position.

2. The antitheft device of claim 1 wherein the valve assembly is in the open position when the lock mechanism is in the open position and wherein the valve assembly is in the closed position when the lock mechanism is in the locked position.

3. The antitheft device of claim 1 wherein the antitheft device is operative when the parking brake is set and the lock mechanism is in the locked position.

4. An antitheft device for use with an automobile having a vacuum line connected to a vacuum release parking brake assembly and with the automobile having an ignition lock, including:
   a valve coupled in the vacuum line connected to the vacuum release parking brake assembly and with the valve having open and closed positions to control the operation of the vacuum release parking brake assembly; and
   a lock separate from the ignition lock having open and locked positions and with the lock including means for controlling the valve so as to control the vacuum release parking brake assembly to prevent the release when the lock is in the locked position.

5. An antitheft device for an automobile including an ignition lock, including:
   a vacuum line operatively interconnected within the automobile and with a vacuum within the vacuum line when the engine of the automobile is running and with no vacuum within the vacuum line when the automobile is not running;
   a parking brake assembly coupled to the vacuum line and with the parking brake assembly normally controlled to release when there is a vacuum within the vacuum line;
   a valve having open and closed positions coupled to the vacuum line for controlling the application of the vacuum to the parking brake assembly; and
   a lock separate from the ignition lock having open and locked positions connected to the valve to control the valve to prevent the release of the parking brake when the lock is in the locked position.

6. An antitheft device for use with an automobile having a vacuum line connected to a vacuum release parking brake assembly, including:
   a combination lock mechanism having open and locked positions;
   a valve assembly coupled to the combination lock mechanism and with the valve assembly having open and closed positions and with the position of the valve assembly controlled by the position of the combination lock mechanism; and
   means interconnecting the valve assembly with the vacuum line to prevent the release of the parking brake when the combination lock mechanism is in the locked position.

7. An antitheft device for use with an automobile having a vacuum line connected to a vacuum release parking brake assembly, including:
   a valve coupled in the vacuum line connected to the vacuum release parking brake assembly and with the valve having open and closed positions to control the operation of the vacuum release parking brake assembly; and
   a combination lock having open and locked positions and with the combination lock including means for controlling the valve so as to control the vacuum release parking brake assembly to prevent the release when the combination lock is in the locked positions.

8. An antitheft device for an automobile, including:
   a vacuum line operatively interconnected within the automobile and with a vacuum within the vacuum line when the engine of the automobile is running and with no vacuum within the vacuum line when the automobile is not running;
   a parking brake assembly coupled to the vacuum line and with the parking brake assembly normally controlled to release when there is a vacuum within the vacuum line;
   a valve having open and closed positions coupled to the vacuum line for controlling the application of the vacuum to the parking brake assembly; and
   a combination lock having open and locked positions connected to the valve to control the valve to prevent the release of the parking brake when the combination lock is in the locked position.